United States Patent
Grin et al.

(10) Patent No.: US 11,816,349 B2
(45) Date of Patent: Nov. 14, 2023

(54) REDUCE COMMAND LATENCY USING BLOCK PRE-ERASE

(71) Applicant: Western Digital Technologies, Inc., San Jose, CA (US)

(72) Inventors: Lola Grin, Netanya (IL); Itay Busnach, Raanana (IL); Micha Yonin, Rehovot (IL); Lior Bublil, Petah Tikva (IL)

(73) Assignee: Western Digital Technologies, Inc., San Jose, CA (US)

( * ) Notice: Subject to any disclaimer, the term of this patent is extended or adjusted under 35 U.S.C. 154(b) by 113 days.

(21) Appl. No.: 17/518,144

(22) Filed: Nov. 3, 2021

(65) Prior Publication Data
US 2023/0137039 A1    May 4, 2023

(51) Int. Cl.
G06F 3/06    (2006.01)
(52) U.S. Cl.
CPC .......... G06F 3/0652 (2013.01); G06F 3/0604 (2013.01); G06F 3/0679 (2013.01)
(58) Field of Classification Search
None
See application file for complete search history.

(56) References Cited

U.S. PATENT DOCUMENTS

| | | | |
|---|---|---|---|
| 5,255,270 A | 10/1993 | Yanai et al. | |
| 6,324,495 B1 | 11/2001 | Steinman | |
| 6,405,323 B1 * | 6/2002 | Lin | G11C 29/765 714/6.13 |
| 6,526,477 B1 | 2/2003 | Yuan et al. | |
| 6,977,847 B2 | 12/2005 | Lasser et al. | |

(Continued)

FOREIGN PATENT DOCUMENTS

| | | |
|---|---|---|
| CN | 1520562 A | 8/2004 |
| CN | 1542607 A | 11/2004 |

(Continued)

OTHER PUBLICATIONS

Anonymous, "Understanding Flash: The Flash Translation Layer", Sep. 17, 2014, pp. 1-4, https://flashdba.com/2014/09/17/understanding-flash-the-flash-translation-layer/ (Year: 2014).*

(Continued)

*Primary Examiner* — Christopher D Birkhimer
(74) *Attorney, Agent, or Firm* — PATTERSON + SHERIDAN, LLP; Steven H. VerSteeg (57) ABSTRACT

A system and apparatus for secure NVM format by pre-erase is disclosed. According to certain embodiments when an NVM does into idle mode, one or more free blocks are serially popped from a free block heap. The free block is then physically erased in an SLC mode, and then pushed to a pre-erase heap. The process is performed in both SLC and TLC partitions, in the TLC partition the block becomes hybrid SLC (HSLC). This process increases a program erase count (PEC) value of the block, maintaining device longevity. When there is a need to use a new block, it is popped from the pre-erase heap. In some cases where there is a need to use a TLC block instead of an HSLC block, an erase operation is used that converts the block from HSLC to TLC, and does not increase a PEC value for the block.

20 Claims, 4 Drawing Sheets

(56) References Cited

U.S. PATENT DOCUMENTS

| | | | |
|---|---|---|---|
| 7,366,826 B2 | 4/2008 | Gorobets et al. | |
| 7,386,655 B2 | 6/2008 | Gorobets et al. | |
| 7,564,721 B2 | 7/2009 | Roohparvar | |
| 7,865,658 B2 | 1/2011 | Lasser et al. | |
| 8,006,047 B2 | 8/2011 | De Souza et al. | |
| 8,099,569 B2 | 1/2012 | Sugiura | |
| 8,244,958 B2 | 8/2012 | Lasser | |
| 8,423,710 B1* | 4/2013 | Gole | G06F 12/0246 711/113 |
| 8,473,963 B2 | 6/2013 | Kottapalli et al. | |
| 8,578,093 B1 | 11/2013 | Dafoe et al. | |
| 8,904,118 B2 | 12/2014 | Mamidala et al. | |
| 8,966,176 B2 | 2/2015 | Duzly et al. | |
| 9,037,777 B2 | 5/2015 | Sabbag | |
| 9,047,178 B2 | 6/2015 | Talagala et al. | |
| 9,116,791 B2 | 8/2015 | Agami | |
| 9,146,824 B1 | 9/2015 | Chen et al. | |
| 9,229,876 B2 | 1/2016 | Slepon | |
| 9,317,366 B2 | 4/2016 | Wang | |
| 9,368,218 B2 | 6/2016 | Ziperovich | |
| 9,633,738 B1 | 4/2017 | Guo et al. | |
| 9,817,593 B1 | 11/2017 | Inbar et al. | |
| 9,836,392 B2 | 12/2017 | Adachi et al. | |
| 9,927,984 B2 | 3/2018 | Qiu et al. | |
| 9,959,044 B2 | 5/2018 | Liu et al. | |
| 10,209,914 B2 | 2/2019 | Agarwal et al. | |
| 10,228,951 B1 | 3/2019 | Kothari et al. | |
| 10,359,955 B2 | 7/2019 | Inbar et al. | |
| 10,366,711 B1* | 7/2019 | Liu | G11B 9/1409 |
| 10,372,351 B2 | 8/2019 | Frid et al. | |
| 10,567,006 B2 | 2/2020 | Hahn et al. | |
| 10,658,045 B1* | 5/2020 | Yang | G11C 16/26 |
| 2001/0002475 A1 | 5/2001 | Bothwell et al. | |
| 2004/0103241 A1 | 5/2004 | Chang et al. | |
| 2004/0202024 A1* | 10/2004 | Shinagawa | G11C 16/107 365/185.29 |
| 2004/0264253 A1* | 12/2004 | Hirano | G11C 16/3445 365/185.29 |
| 2008/0168252 A1 | 7/2008 | Kunimune et al. | |
| 2009/0327589 A1* | 12/2009 | Moshayedi | G06F 3/0688 711/E12.001 |
| 2011/0063313 A1 | 3/2011 | Bolz et al. | |
| 2011/0099325 A1 | 4/2011 | Roh et al. | |
| 2011/0161557 A1 | 6/2011 | Haines et al. | |
| 2011/0191652 A1 | 8/2011 | Dave et al. | |
| 2011/0202709 A1* | 8/2011 | Rychlik | G06F 3/0641 711/E12.001 |
| 2011/0296088 A1 | 12/2011 | Duzly et al. | |
| 2011/0302446 A1 | 12/2011 | Becker-Szendy et al. | |
| 2012/0054419 A1 | 3/2012 | Chen et al. | |
| 2012/0072641 A1 | 3/2012 | Suzuki et al. | |
| 2012/0084490 A1 | 4/2012 | Choi et al. | |
| 2012/0239853 A1 | 9/2012 | Moshayedi | |
| 2012/0317377 A1 | 12/2012 | Palay et al. | |
| 2013/0073897 A1 | 3/2013 | Khmelnitsky | |
| 2013/0117750 A1 | 5/2013 | Howes et al. | |
| 2013/0138873 A1 | 5/2013 | Gorobets et al. | |
| 2014/0006858 A1 | 1/2014 | Helfman et al. | |
| 2014/0033209 A1 | 1/2014 | Lih et al. | |
| 2014/0059270 A1 | 2/2014 | Zaltsman et al. | |
| 2014/0173180 A1 | 6/2014 | D'Abreu et al. | |
| 2014/0181371 A1 | 6/2014 | Thomas | |
| 2014/0281122 A1 | 9/2014 | Lieber | |
| 2014/0325115 A1 | 10/2014 | Ramsundar et al. | |
| 2014/0379991 A1 | 12/2014 | Lomet et al. | |
| 2015/0169228 A1 | 6/2015 | Sivasankaran et al. | |
| 2015/0381206 A1 | 12/2015 | Fainzilber et al. | |
| 2016/0004634 A1 | 1/2016 | Kim | |
| 2016/0055084 A1 | 2/2016 | Rangaswami et al. | |
| 2016/0110249 A1 | 4/2016 | Orme et al. | |
| 2016/0124640 A1 | 5/2016 | Park | |
| 2016/0163392 A1 | 6/2016 | Zhao et al. | |
| 2016/0188212 A1 | 6/2016 | Camp et al. | |
| 2016/0188223 A1 | 6/2016 | Camp et al. | |
| 2016/0188231 A1 | 6/2016 | Mittelholzer et al. | |
| 2016/0299710 A1 | 10/2016 | Chang et al. | |
| 2017/0075623 A1 | 3/2017 | Oshiyama et al. | |
| 2017/0161099 A1 | 6/2017 | Rashid et al. | |
| 2017/0201502 A1 | 7/2017 | Sun | |
| 2017/0242584 A1 | 8/2017 | Zhang et al. | |
| 2017/0262034 A1 | 9/2017 | Isaac et al. | |
| 2017/0315919 A1 | 11/2017 | Guthrie et al. | |
| 2017/0315922 A1 | 11/2017 | Guthrie et al. | |
| 2017/0322735 A1 | 11/2017 | Liu et al. | |
| 2018/0004428 A1 | 1/2018 | Seong et al. | |
| 2018/0024920 A1 | 1/2018 | Thomas et al. | |
| 2018/0039541 A1 | 2/2018 | Hahn et al. | |
| 2018/0101477 A1 | 4/2018 | Kan et al. | |
| 2018/0143886 A1 | 5/2018 | Liu et al. | |
| 2018/0188980 A1* | 7/2018 | Tai | G06F 12/0246 |
| 2018/0239532 A1 | 8/2018 | Inbar et al. | |
| 2019/0036704 A1 | 1/2019 | DeVetter et al. | |
| 2019/0087331 A1* | 3/2019 | Lappi | G06F 12/0868 |
| 2021/0064249 A1* | 3/2021 | Mehta | G06F 11/1048 |
| 2022/0317914 A1 | 10/2022 | Kulkarni et al. | |

FOREIGN PATENT DOCUMENTS

| | | |
|---|---|---|
| CN | 100590608 C | 2/2010 |
| CN | 101674307 A | 3/2010 |
| CN | 104716954 A | 6/2015 |
| CN | 104903842 A | 9/2015 |
| CN | 106055489 A | 10/2016 |
| CN | 106294215 A | 1/2017 |
| EP | 2374063 B1 | 11/2017 |
| KR | 20040038706 A | 5/2004 |
| KR | 20110118782 A | 11/2011 |
| KR | 20130030237 A | 3/2013 |
| KR | 20150096646 A | 8/2015 |
| TW | 201419303 A | 5/2014 |

OTHER PUBLICATIONS

Xiangquan et al. "Research on Network Processors Parallel Processing and Congestion Control Mechanisms in the High Performance Router," Graduate School of National University of Defense Technology, pp. 1-117, Oct. 2007, English Abstract.

Kulami et al. "Pre-Erasure of Memory in Storage Devices," U.S. Appl. No. 17/222,459, filed Apr. 5, 2021.

Office Action issued in counterpart Korean Patent Application No. 10-2017-0176507, dated Jun. 26, 2019 (12 pages).

Written Opinion issued in corresponding Korean Patent Application No. 10-2017-0176507, dated Aug. 22, 2019 (8 pages).

Decision on Registration issued in corresponding Korean Patent Application No. 10-2017-0176507, dated Sep. 18, 2019 (3 pages).

* cited by examiner

Provide a controller includes a format NVM module, a pre-erase flow and a pre-erse data structure confiugred to perform and manage the NVM command
304

Pop un-erased blocks from the free block heap, erasing the blocks, and pushing them to the pre-erase block heap
308

Skip erase operations on blocks that are listed in the pre-erase heap and adding to the list of blocks that were erased by the secure NVM format component
312

Synchronize secure NVM format component execution with the CS flow, and store the pre-erase heap in the CS FTL log
316

Recover the pre-erase heap from the last CS FTL log
320

REDUCE COMMAND LATENCY USING BLOCK PRE-ERASE

BACKGROUND OF THE DISCLOSURE

Field of the Disclosure

Embodiments of the present disclosure generally relate to a controller for a storage device, and more particularly to providing block-erase functionality to a storage device.

Description of the Related Art

Non-volatile memory (NVM) in a solid-state storage device such as a solid-state drive (SSD) conventionally requires erasing NVM memory blocks immediately prior to being programmed with useful data. NVM memory blocks marked as ready to receive new data are typically processed with a 'flash and fill' operation to hold placeholder data that needs to be erased before programming with the useful data. Before programming, these blocks must be physically erased.

A physical erase is a very long operation slowing down performance of the SSD at a point in time when write operations are pending. Moreover, for each physical erase, a program erase counter (PEC) for the erased block is incremented, shortening the useful life of the NVM.

Accordingly, what is needed are systems and methods to address the performance issues of conventional approaches.

SUMMARY OF THE DISCLOSURE

The present disclosure generally relates to system and apparatus for secure NVM format by pre-erase. According to certain embodiments when an NVM goes into idle mode, one or more free blocks are serially popped from a free block heap. The free block is then physically erased in an SLC mode, and then pushed to a pre-erase heap. The process is performed in both SLC and TLC partitions, in the TLC partition the block becomes HSLC (Hybrid SLC). This process increases a PEC value of the block, maintaining device longevity (the counter of erase operations of the current block). When there is a need to use a new block, it is popped from the pre-erase heap. In some cases where is a need to use a TLC block instead of HSLC, a special erase operation is taken which converts the block from HSLC to TLC, but doesn't increase a PEC value of the block.

In one embodiment, a data storage device is disclosed that includes a non-volatile memory (NVM) device, and a controller coupled to the NVM device and configured to perform a method for block pre-erase. The method includes, responsive to the NVM device being in an idle state, identifying a free block in a free block heap, erasing data in the free block to create an erased block, and adding the erased block to a pre-erase block list.

In another embodiment, a controller for a data storage device is disclosed, that includes a memory comprising computer-readable instructions, and a processor coupled to the memory and configured to read the computer-readable instructions. The computer-readable instructions cause the processor to erase data from a block of memory from an NVM device to generate an erased block, and add the erased block to a pre-erase block list. The computer-readable instructions further cause the processor to receive an erase command for a block of an NVM device, and responsive to receiving the erase command, provide the erased block from the pre-erase block list.

In another embodiment, a data storage device is disclosed that includes a non-volatile memory (NVM) means, and a controller configured to detect an idle state of the NVM means, identify a free block in a free block list, and erase data in the free block, thereby generating an erased block. The controller is further configured to provide the erased block to a pre-erase block list.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein, and shall not be considered an element or limitation of the appended claims except where explicitly recited in a claim(s).

The present disclosure relates to a system and apparatus for secure NVM format by pre-erase. According to certain embodiments when an NVM does into idle mode, one or more free blocks are serially popped from a free block heap. The popped free block is converted to SLC mode if the block is not already in SLC mode by the following erase operation. The free block is then physically erased in an SLC mode, and then pushed to a pre-erase heap. When an erased block is needed in response to commands issued by a host (usually write commands), a block is popped from the pre-erase heap in response and is ready for usage. By using a pre-erased block from the pre-erase heap, latency of execution of the host command is reduced, as an erase operation is not needed at time of execution.

Example System

Figure 1:
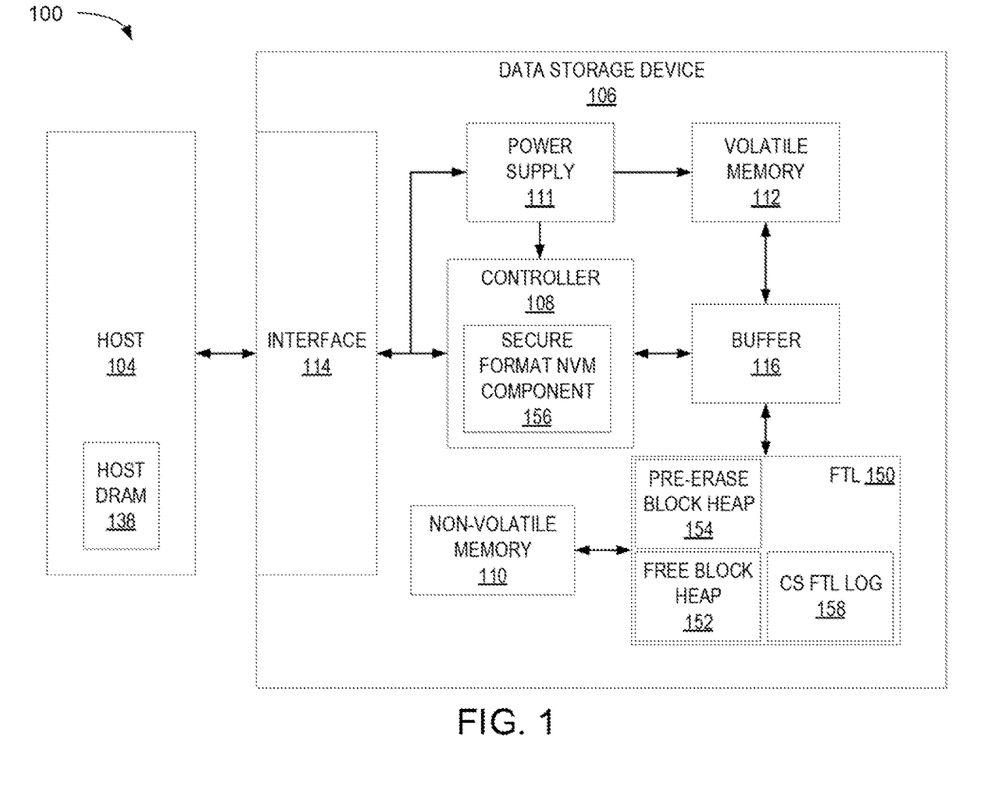
FIG. 1 is a schematic block diagram illustrating a storage system, according to certain embodiments.

FIG. 1 is a schematic block diagram illustrating a storage system 100 in which a host device 104 is in communication with a data storage device (DSD) 106, according to certain embodiments. For instance, the host device 104 may utilize a non-volatile memory (NVM) 110 included in DSD 106 to store and retrieve data. The host device 104 comprises a host DRAM 138. In some examples, the storage system 100 may include a plurality of storage devices, such as the DSD 106, which may operate as a storage array. For instance, the storage system 100 may include a plurality of DSD 106 configured as a redundant array of inexpensive/independent disks (RAID) that collectively function as a mass storage device for the host device 104.

The host device 104 may store and/or retrieve data to and/or from one or more storage devices, such as the DSD 106. As illustrated in FIG. 1, the host device 104 may communicate with the DSD 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The DSD 106 includes a controller 108, NVM 110, a power supply 111, volatile memory 112, the interface 114, and a write buffer 116. In some examples, the DSD 106 may include additional components not shown in FIG. 1 for the sake of clarity. For example, the DSD 106 may include a printed circuit board (PCB) to which components of the DSD 106 are mechanically attached and which includes electrically conductive traces that electrically interconnect components of the DSD 106 or the like. In some examples, the physical dimensions and connector configurations of the DSD 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the DSD 106 may be directly coupled (e.g., directly soldered or plugged into a connector) to a motherboard of the host device 104, or may be located remotely from the host 104 and accessed via a network or bus (e.g., PCIe) via interface 114.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the DSD 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and from NVM flash memory devices at the page level and erase data from NVM flash memory devices at the block level.

The DSD 106 includes a flash translation layer (FTL) 150, for providing logical to physical address translation, garbage collection, wear leveling, error correction code (ECC), bad block management, in addition to other functions described herein. The FTL 150 is coupled to the NVM 110, and is coupled directly or indirectly to the controller 108. FTL 150 includes a free block heap 152 for storing references to free blocks within the NVM 110, and a pre-erase block heap 154 for storing references to erased blocks that are available for programming, as discussed further below. Although these structures are referred to as a 'heap,' one of skill in the art will appreciate that any suitable architecture may be used to store these references, such as a list, an array, a stack, or other suitable structure. It is understood that terms such as 'push' and 'pull' in the context of a heap or other data structure as used herein refers to storage of a reference to a location on the NVM 110. Such a reference may be logical or physical.

The power supply 111 may provide power to one or more components of the DSD 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in an idle or shutdown mode, such as where power ceases to be received from the external device, or is received at a lower rate. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information such as command queues, error correction code (ECC) data, and other data that may be utilized by the controller 108 during operation of the DSD 106. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the DSD 106. For instance, controller 108 may manage the reading of data from and/or the writing of data to the NVM 110. In some embodiments, when the DSD 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the DSD 106 receives a write command from the host device 104, the controller 108 temporarily stores the data associated with the write command in the internal memory or write buffer 116 before sending the data to the NVM 110. Controller further includes a secure format NVM component 156 that causes the FTL 150 to execute a process for secure pre-erase of free blocks, discussed below. Controller 108 further includes a command synchronization (CS) FTL log 158 for storing synchronized commands such as the pre-erase command as discussed below, for recovery of the DSD 106 after an ungraceful shut down (UGSD), to recover a pre-erase heap (discussed below).

According to certain embodiments, when the DSD 106 enters an idle mode, the controller causes the FTL 150 to pop a free block from the free block heap 152 and perform an SLC erase on the free block, and moving the erased free block to the pre-erase block heap 154. According to certain embodiments, if the free block is not already an SLC block, such as a TLC block, the block is converted to a hybrid SLC (HSLC) block (e.g., an SLC block in a TLC partition) and the erase is performed. According to certain embodiments, the erase is a physical erase, while in other the erase may be a logical erase, or a combination of a logical and physical erase.

When the host issues a command requiring an erased block, or erasure of a block, if there are erased blocks available in the pre-erase block heap 154, these blocks are provided in response to the host command. If there are no blocks available in the pre-erase block heap 154, a block is retrieved from the free block heap 152 and an erase is performed. By erasing free blocks during idle cycles of the DSD 106 and providing these via the pre-erase block heap 154, when a host issues a command requiring an erased block, the long process of erasing a block (e.g., a physical erase) may be avoided, thereby improving performance of the DSD 106.

Example Process Diagram

Figure 2:
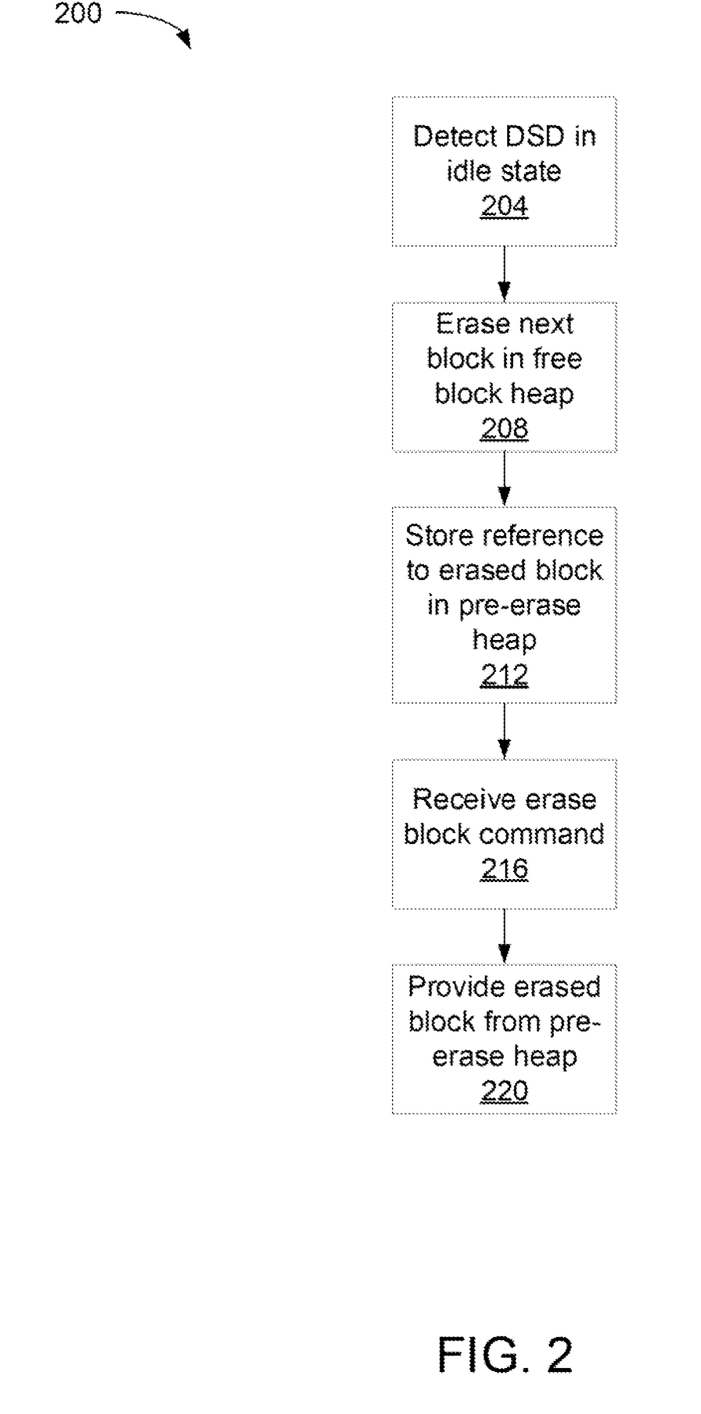
FIG. 2 depicts a process diagram for NVM block pre-erase, according to certain embodiments.

FIG. 2 depicts a process diagram 200 for NVM block pre-erase, according to certain embodiments. At block 204, the controller 108 detects that the DSD 106 is in an idle state. At block 208, when controller 108 detects that the DSD 106 is in an idle state, the controller 108 causes the FTL 150 to iteratively pop free blocks off of the free block heap 152 and cause these free blocks to be securely (e.g., physically) erased. At block 212, the FTL 150 stores the erased blocks in the pre-erase block heap 154. According to certain embodiments, if the idle state is exited, the FTL 150 ceases popping off and erasing further free blocks until the DSD 106 enters an idle state once more.

At block 216, an erase block command is received by the controller 108, such as issued by the host 104, for example, as part of a write command issued by the host 104. According to certain embodiments, such a command may be one that requires an erased block for operation. At block 220, instead of performing an erase on a block, an erased block is provided by popping an erased block from the pre-erase block heap 154. According to certain embodiments, the controller 108 may cause the erased block to be popped from the pre-erase block heap 154, while in other embodiments, the FTL 150 may cause the erased block to be popped in response to the command from the host.

Example Flow Diagram for Secure NVM Format

Figure 3:
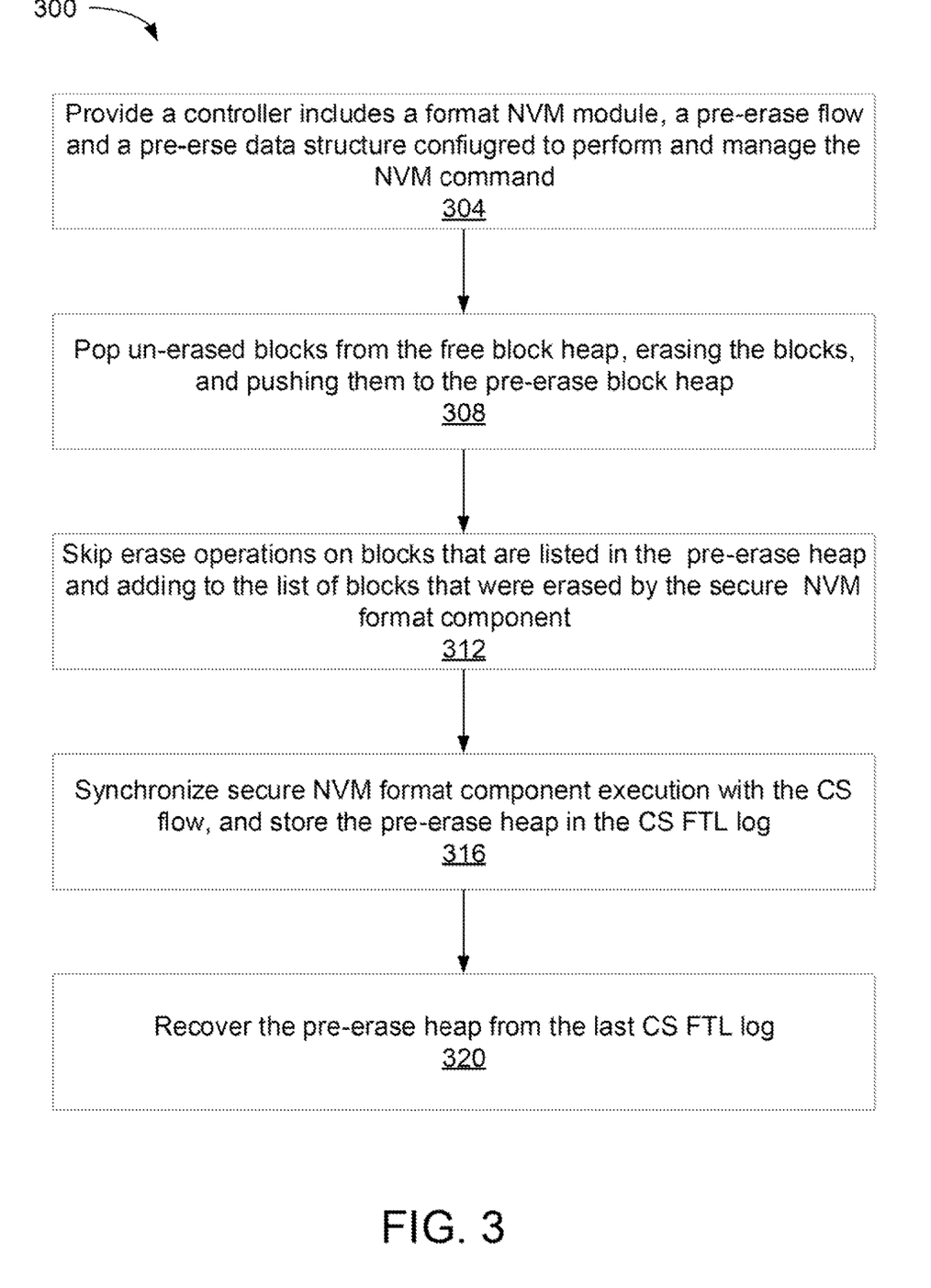
FIG. 3 depicts a flow diagram depicting a secure NVM format process flow, according to certain embodiments.

FIG. 3 depicts a flow diagram 300 depicting a secure NVM format process flow, according to certain embodiments. According to certain embodiments, pre-erase blocks added to the pre-erase block heap in accordance with the process of FIG. 2 may be utilized to increase performance (e.g., decrease latency) of a secure NVM format, executed by secure NVM format component 156.

At block 304, the controller 108 with secure format NVM component 156 configured to utilize pre-erase blocks in the pre-erase block heap 154 resulting from the process depicted by FIG. 2.

At block 304, one or more un-erased blocks are popped from the free block heap 152, erased, and pushed to the pre-erase block heap 154, similar to the process depicted in FIG. 2. At block 308, un-erased blocks are popped from the free block heap 152, the blocks are erased (e.g., physically erased) and pushed to the pre-erase block heap 154, similar to the process depicted in FIG. 2.

At block 312, a secure NVM format command is received by the controller. In executing the secure NVM format command, the secure NVM format component 156 skips erase operation for blocks that are listed in the pre-erase block heap 154, 156.

At block 316, the secure format NVM component 156 execution is synchronized with the command synch flow, and the pre-erase block heap 154 is stored in the CS FTL log 158. At block 320, the pre-erase block heap 154 may be recovered from the CS FTL log 158.

Example Method

Figure 4:
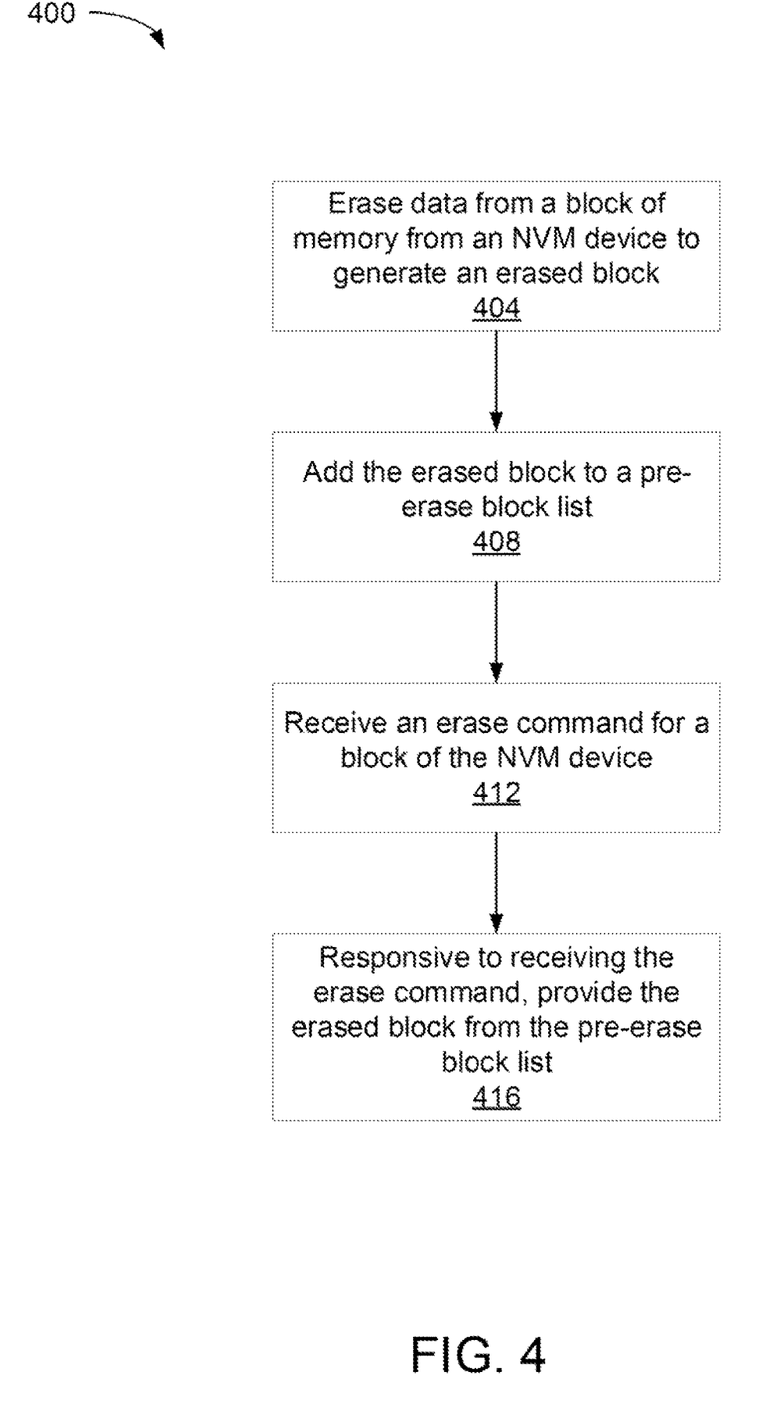
FIG. 4 depicts an example method for secure format NVM by pre-erase, according to certain embodiments.

FIG. 4 depicts an example method 400 for secure format NVM by pre-erase, according to certain embodiments. According to certain embodiments, a block of memory from an NVM device such as NVM 110 is pushed to the pre-erase block heap 154, and the controller 108 detects an idle state of one or more components of the DSD 106, such as the NVM device.

At block 404, the controller 108 erases data from a block of memory of an NVM device, such as NVM 110, to generate an erased block. According to certain embodiments, the erase is an SLC erase. If the block is configured to be of a different cell type, such as TLC, the block is first converted to SLC.

At block 408, the FTL 150 pushes the erased block to the pre-erase block heap 154. According to certain embodiments, the erased block is maintained in an erased state while stored in the pre-erase heap.

At block 412, the DSD 106 receives an erase command from the host 104, for a block of the NVM device.

At block 416, responsive to receiving the erase command, the FTL 150 provides the erased block from the pre-erase block heap 154. According to certain embodiments, the erased block may be provided in response to a write command.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

In one embodiment, a data storage device is disclosed that includes a non-volatile memory (NVM) device, and a controller coupled to the NVM device and configured to perform a method for NVM pre-erase. The method includes, responsive to the NVM device being in an idle state, identifying a free block in a free block heap, erasing data in the free block to create an erased block, and adding the erased block to a pre-erase block list. According to certain embodiments, the method further includes, responsive to an erase command received from a host, popping the erased block from the pre-erase block heap. In certain embodiments, erasing the data includes an SLC erase, and erasing the data may further include converting a TLC to an SLC and then performing the SLC erase. The method further includes maintaining the erased block in an erased state. According to certain embodiments, the pre-erase block heap is stored in an FTL of the controller. In some embodiments, the method further includes updating the pre-erase block heap upon popping the erased block from the pre-erase block heap, responsive to a write command.

In another embodiment, a controller for a data storage device is disclosed, that includes a memory comprising computer-readable instructions, and a processor coupled to the memory and configured to read the computer-readable instructions. The computer-readable instructions cause the processor to erase data from a block of memory from an NVM device to generate an erased block, and add the erased block to a pre-erase block list. The computer-readable instructions further cause the processor to receive an erase command for a block of an NVM device, and responsive to receiving the erase command, provide the erased block from the pre-erase block list. The computer-readable instructions further cause the processor to allocate the block of memory to a free-block heap, and identify an idle state of the NVM device, and responsive to identification of the idle state of the NVM device, erasing data from the block of memory. The computer-readable instructions that cause the processor to erase data from the block of memory includes an SLC erase. The computer-readable instructions that cause the processor to erase data from the block of memory includes converting a TLC to an SLC and performing the SLC erase. The computer-readable instructions further cause the processor to maintain the erased block in an erased state. The controller further includes an FTL, wherein the pre-erase block heap is stored in the FTL. The computer-readable instructions further cause the processor to update the pre-erase block heap upon popping the erased block from the pre-erase block heap, responsive to a write command.

In another embodiment, a data storage device is disclosed that includes a non-volatile memory (NVM) means, and a controller configured to detect an idle state of the NVM means, identify a free block in a free block list, and erase data in the free block, thereby generating an erased block. The controller is further configured to provide the erased block to a pre-erase block list. The controller is further configured to receive an erase command and responsive to the erase command, pop the erased block from the pre-erase block heap. The controller is further configured to erase data in the free block with an SLC erase. The controller is further configured to maintain the erased block in an erased state. The controller is further configured to store the pre-erase block heap in a FTL means. The controller is further configured to update the pre-erase block heap upon an allocation of the erased block in response to a command from a host.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
 a non-volatile memory (NVM) device; and
 a controller coupled to the NVM device and configured to perform a method for block pre-erase, the method comprising:
  responsive to the NVM device being in an idle state:
   identifying a free block in a free block heap;
   erasing data in the free block to create an erased block;
   pushing the erased block to a pre-erase block heap;
   receiving a secure NVM format command, wherein execution of the secure NVM format command is synchronized with a command sync flow, wherein the pre-erase block heap is stored in a control sync flash translation layer (FTL) log; and
   skipping an erase operation for blocks listed in the pre-erase block heap.

2. The data storage device of claim 1, wherein the method further comprises, responsive to an erase command received from a host, popping the erased block from the pre-erase block heap.

3. The data storage device of claim 2, wherein erasing the data comprises a single layer cell (SLC) erase.

4. The data storage device of claim 3, wherein erasing the data further comprises converting a triple-layer cell (TLC) to an SLC and performing the SLC erase.

5. The data storage device of claim 3, the method further comprising maintaining the erased block in an erased state.

6. The data storage device of claim 5, wherein the pre-erase block heap is stored in a flash translation layer (FTL) of the controller.

7. The data storage device of claim 6, the method further comprising updating the pre-erase block heap upon popping the erased block from the pre-erase block heap responsive to a write command.

8. A controller for a data storage device, comprising:
 a memory comprising computer-readable instructions; and
 a processor coupled to the memory and configured to read the computer-readable instructions that cause the processor to:
  erase data from a block of memory from an NVM device to generate an erased block:
  push the erased block to a pre-erase block heap;
  receive an erase command for a block of the NVM device;
  responsive to receiving the erase command, pop the erased block from the pre-erase block heap;
  receive a secure NVM format command, wherein execution of the secure NVM format command is synchronized with a command sync flow, wherein the pre-erase block heap is stored in a control sync flash translation layer (FTL) log; and
  skip an erase operation for blocks listed in the pre-erase block heap.

9. The controller of claim 8, wherein the computer-readable instructions further cause the processor to:
 allocate the block of memory to a free-block heap; and
 identify an idle state of the NVM device, and responsive to identification of the idle state of the NVM device, erasing data from the block of memory.

10. The controller of claim 9, wherein the computer-readable instructions that causes the processor to erase data from the block of memory comprises a single layer cell (SLC) erase.

11. The controller of claim 10, wherein the computer-readable instructions that cause the processor to erase data from the block of memory comprises converting a triple layer cell (TLC) to an SLC and performing the SLC erase.

12. The controller of claim 11, wherein the computer-readable instructions further cause the processor to maintain the erased block in an erased state.

13. The controller of claim 12, further comprising a flash translation layer (FTL), wherein the pre-erase block heap is stored in the FTL.

14. The controller of claim 13, wherein the computer-readable instructions further cause the processor to update the pre-erase block heap upon popping the erased block from the pre-erase block heap, responsive to a write command.

15. A data storage device, comprising:
an NVM means; and
a controller configured to:
  detect an idle state of the NVM means:
  identify a free block in a free block heap;
  erase data in the free block, thereby generating an erased block; and
  push the erased block to a pre-erase block heap;
  receive a secure NVM format command, wherein execution of the secure NVM format command is synchronized with a command sync flow, wherein the pre-erase block heap is stored in a control sync flash translation layer (FTL) log; and
  skip an erase operation for blocks listed in the pre-erase block heap.

16. The data storage device of claim 15, the controller being further configured to receive an erase command, and responsive to the erase command, pop the erased block from the pre-erase block heap.

17. The data storage device of claim 16, the controller being further configured to erase data in the free block with a single layer cell (SLC) erase.

18. The data storage device of claim 17, the controller being further configured to maintain the erased block in an erased state.

19. The data storage device of claim 18, the controller being further configured to store the pre-erase block heap in a flash translation layer means.

20. The data storage device of claim 19, the controller being further configured to update the pre-erase block heap upon an allocation of the erased block in response to a command from a host.

* * * * *